US009471309B2

(12) United States Patent
Song et al.

(10) Patent No.: US 9,471,309 B2
(45) Date of Patent: Oct. 18, 2016

(54) ARITHMETIC PROCESSING APPARATUS AND METHOD FOR HIGH SPEED PROCESSING OF APPLICATION

(71) Applicant: SAMSUNG ELECTRONICS CO., LTD., Suwon (KR)

(72) Inventors: Joon Ho Song, Hwaseong (KR); Shi Hwa Lee, Seoul (KR); Do Hyung Kim, Hwaseong (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 595 days.

(21) Appl. No.: 13/945,267

(22) Filed: Jul. 18, 2013

(65) Prior Publication Data

US 2014/0025934 A1     Jan. 23, 2014

(30) Foreign Application Priority Data

Jul. 19, 2012 (KR) .................. 10-2012-0078847

(51) Int. Cl.
*G06F 9/30* (2006.01)
*G06F 9/54* (2006.01)

(52) U.S. Cl.
CPC ............ *G06F 9/3001* (2013.01); *G06F 9/544* (2013.01)

(58) Field of Classification Search
CPC .............................. G06F 9/3001; G06F 9/544
See application file for complete search history.

(56) References Cited

U.S. PATENT DOCUMENTS

| 5,590,323 A | 12/1996 | Kartalopoulos | |
| 5,983,278 A * | 11/1999 | Chong | H04L 12/5602 370/414 |
| 7,797,515 B2 | 9/2010 | Todoroki et al. | |
| 2002/0143874 A1 | 10/2002 | Marquette et al. | |
| 2004/0054880 A1 | 3/2004 | Bernstein et al. | |
| 2004/0064818 A1 | 4/2004 | Alverson et al. | |
| 2007/0192568 A1 | 8/2007 | Fish, III | |
| 2008/0189515 A1 | 8/2008 | Kleihorst et al. | |

FOREIGN PATENT DOCUMENTS

| KR | 2000-0070858 | 11/2000 |
| KR | 10-2007-0064432 | 6/2007 |
| KR | 10-2012-0003014 | 1/2012 |

OTHER PUBLICATIONS

Ramacher U et al., Synapse-1: a high-speed general purpose parallel neurocomputer system 11Parallel Processing Symposium, 1995. Proceedings., 9th International Santa Barbara, CA, USA Apr. 25-28, 1995, Los Alamitos, CA, USA,IEEE Comput. Soc, Apr. 25, 1995, pp. 774-781.
Martini P et al: Designing high speed controllers for high speed local area networks 11,19891127; 19891127-19891130, Nov. 27, 1989, pp. 170-17.
Helgeson M et al: Display processing for 1-15 a synthetic vision system (SVS) utilizing the VME environment 11,Proceedings of the Digital Avionics Systems Conference. Seattle, Oct. 5-8, 1992; [Proceedings of the Digital Avionics Systems Conference], New York, IEEE, US, vol. Conf. 11. Oct. 5, 1992, pp. 532-537.
Pallios V et al: "11A high speed access 1-15 mechanism for a multiservice LAN at 144 Mbps" 19880613; 19880613—19880617, Jun. 13, 1988. pp. 256-260.
European Search Report dated Apr. 8, 2014 and issued in corresponding European Patent Application 13177168.5-1957/2687985.

* cited by examiner

*Primary Examiner* — Zachary K Huson
(74) *Attorney, Agent, or Firm* — Staas & Halsey LLP

(57) ABSTRACT

An arithmetic processing apparatus and method for high speed processing of an application are provided. The arithmetic processing apparatus may include a program control unit to store operation processing information necessary for application operation in a communication channel by executing an application code, and an operation processing unit to process the application operation using the operation processing information stored in the communication channel.

18 Claims, 13 Drawing Sheets

| PROGRAM CONTROL UNIT 901 | 102 | 129 | 42 | 23 | 18 | 221 | 20 | 108 | 51 |

| OPERATION PROCESSING UNIT 902 | 2 | 7 | 67 | 53 | 63 | 169 | 16 | 140 |

ARITHMETIC PROCESSING APPARATUS AND METHOD FOR HIGH SPEED PROCESSING OF APPLICATION

CROSS-REFERENCE TO RELATED APPLICATIONS

This application claims the priority benefit of Korean Patent Application No. 10-2012-0078847, filed on Jul. 19, 2012, in the Korean Intellectual Property Office, the disclosure of which is incorporated herein by reference.

BACKGROUND

1. Field

One or more example embodiments of the following description relate to an arithmetic processing apparatus and method for processing an application at a high speed, and more particularly, to an apparatus and method for quickly executing an application by processing an application code and an application operation necessary for driving of the application in a parallel manner.

2. Description of the Related Art

A processing apparatus such as a high-performance processor, a digital signal processor (DSP), and a graphic processing unit (GPU) accelerates operation using a particular computing device that processes an algorithm at a high speed. For example, the particular computing device may include single instruction multiple data (SIMD) and multiple instruction multiple data (MIMD), a hardware accelerator, and the like. Here, the SIMD refers to a parallel computing method to process several units of data with one instruction. The MIMD refers to a parallel operation method to process several units of data with a plurality of instructions.

When using the SIMD, the MIMD, and the like, a program control device and the particular computing device are alternately operated to execute an application operation.

Here, since the program control device maintains an idle state during operation of the particular computing device, execution of the application may be delayed. In the same manner, the particular computing device may maintain an idle state while the program control device is executing the application operation or an application code, thereby causing a delay in execution of the application.

In addition, during idle states of the program control device and the particular computing device, hardware may be wasted and accordingly the efficiency of the processing apparatus may be reduced.

SUMMARY

The foregoing and/or other aspects are achieved by providing an arithmetic processing apparatus including a program control unit to store operation processing information necessary for an application operation in a communication channel by executing an application code, and an operation processing unit to process the application operation using the operation processing information stored in the communication channel.

The program control unit may store operation processing information necessary for a second application operation before the operation processing unit completes processing of a first application operation, and the second application operation may denote an operation to be processed after the first application operation.

The operation processing unit may store feedback information corresponding to a processing result of the application operation in the communication channel.

The program control unit may process the second application operation based on the feedback information stored in the communication channel.

The program control unit may store, in the communication channel, operation processing information of an application operation which is set to be preferentially processed.

The operation processing unit may store, in the communication channel, operation processing information of an application operation which is set to be preferentially processed.

The program control unit may store the operation processing information in the communication channel depending on presence of overflow of the communication channel.

The program control unit may process partial operation of an entire operation necessary for the application operation, and the operation processing unit may process remaining operation excluding the partial operation, thereby completing processing of the application operation.

The operation processing information may include at least one selected from data necessary for processing of the application operation, an address of a memory storing the data, and an operation parameter.

The communication channel may include at least one selected from a buffer, a shared memory, and a register hardwire.

The foregoing and/or other aspects are achieved by providing an arithmetic processing method including storing operation processing information necessary for an application operation in a communication channel by executing an application code, and processing the application operation using the operation processing information stored in the communication channel.

The storing of the operation processing information may include storing operation processing information necessary for a second application operation before processing of a first application operation is completed using the operation processing information stored in the communication channel, and the second application operation may denote operation to be processed after the first application operation.

The processing of the application operation may store feedback information corresponding to a processing result of the application operation in the communication channel.

The storing of the operation processing information may include processing of a second application operation based on the feedback information stored in the communication channel.

The storing of the operation processing information may include storing, in the communication channel, operation processing information of an application operation set to be preferentially processed.

The processing of the application operation may include storing, in the communication channel, feedback information of an application operation set to be preferentially processed.

The storing of the operation processing information may include storing the operation processing information in the communication channel depending on presence of overflow of the communication channel.

The storing of the operation processing information may include processing partial operation of an entire operation necessary for the application operation, and the processing of the application operation may include processing remaining operation excluding the partial operation, thereby completing processing of the application operation.

The foregoing and/or other aspects are achieved by providing a processing apparatus that includes a program control unit, an operation processing unit, and a communication channel. The communication channel includes a first line configured to conduct information from the program control unit to the operation processing unit and a second line configured to conduct information from the operation processing unit to the program control unit. The program control unit transmits information relevant to an application operation to the operation processing unit via the first line when processing of an application by the program control unit needs to be accelerated using the operation processing unit and the operation processing unit transmits feedback information corresponding to a processing result of the application operation to the program control unit via the second line.

The foregoing and/or other aspects are achieved by providing a communication channel that channels data between a program control and an operation processing unit of an arithmetic processor. The communication channel includes a forward first in first out ("FIFO") buffer configured to transmit information from the program control unit to the operation processing unit, a forward Quick FIFO buffer configured to transmit information from the program control unit to the operation processing unit, a backward FIFO buffer configured to transmit information from the operation processing unit to the program control unit, and a backward Quick FIFO buffer configured to transmit information from the operation processing unit to the program control unit. When processing of an application by the program control unit needs to be accelerated using the operation processing unit, the program control unit transmits relevant information to the operation processing unit via the forward FIFO buffer when the program control unit does not have to instantly check a processing result of the operation processing unit and via the forward Quick FIFO buffer when the program control unit does have to instantly check the processing result of the operation processing unit. Also, the operation processing unit transmits an executed operation of the application to the program control unit via the backward FIFO buffer when the program control unit does not have to instantly check the processing result of the operation processing unit and via the backward Quick FIFO buffer when the program control unit does have to instantly check the processing result of the operation processing unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 9 illustrates an operation of accelerating execution of an application in an arithmetic processing apparatus according to example embodiments;

DETAILED DESCRIPTION

Figure 1:
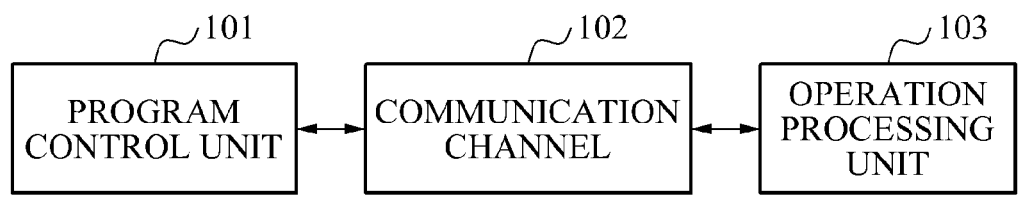
FIG. 1 illustrates an operation of processing an application operation in parallel by an arithmetic processing apparatus using a communication channel, according to example embodiments.

Reference will now be made in detail to example embodiments, examples of which are illustrated in the accompanying drawings, wherein like reference numerals refer to the like elements throughout.

FIG. 1 illustrates an operation of processing an application operation in parallel by an arithmetic processing apparatus 100 using a communication channel, according to example embodiments.

Referring to FIG. 1, the arithmetic processing apparatus 100 may include, for example, a program control unit 101, a communication channel 102, and an operation processing unit 103.

The program control unit 101 may execute an application code. During the execution of the application code the program control unit 101 may temporarily store operation processing information necessary for the application operation in the communication channel 102. Here, the operation processing information may include at least one selected from data necessary for processing of the application operation, an address of a memory storing the data, and an operation parameter.

After operation processing information is stored in the communication channel 102, the program control unit 101 may process a next application operation directly without waiting for an operation processing result of the operation processing unit 103.

For example, the program control unit 101 may temporarily store operation processing information necessary for a first application operation in the communication channel 102 by executing a first application code. Next, the program control unit 101 may temporarily store operation processing information necessary for a second application operation in the communication channel 102 by executing a second application code without waiting until processing of the first application operation is completed.

Thus, the program control unit 101 may reduce a delay caused by the operation processing unit 103, by processing the second application operation before the operation processing unit 103 completes processing of the first application operation. Accordingly, application execution speed may be increased.

The program control unit 101 may temporarily store the operation processing information in the communication channel 102 depending on presence of an overflow of the communication channel 102.

For example, when the communication channel 102 is overflowed, being full of temporarily stored operation processing information, the program control unit 101 may wait until a storage space of the communication channel 102 is secured. Here, the program control unit 101 may wait until the storage space of the communication channel 102 is secured that is sufficiently large to store operation processing information necessary for the next application operation.

In an embodiment, the communication channel 102 may include a plurality of separate communication channels or lines such as a first line and a second line. The first line of the communication channel may be configured to transmit information from the program control unit to the operation processing unit and the second line of the communication channel may be configured to transmit information from the operation processing unit to the program control unit. Each of the first line and the second line may be any of a buffer, a shared memory, a register, or a hardwire. The communication channel may be configured to provide full duplex communication between the program control unit 101 and the operation processing unit 103.

As mentioned previously, the program control unit 101 and the operation processing unit 103 may process the application operation in a sharing manner. Here, the program control unit 101 may determine a partial operation quantity to be processed by the program control unit 101 and a remaining operation quantity, excluding the partial operation quantity, to be processed by the operation processing unit 103, based on at least one selected from an operation processing speed of the program control unit 101, a capacity of the communication channel 102, and an operation processing speed of the operation processing unit 103.

That is, the program control unit 101 may process a partial operation of an entire operation necessary for the application operation based on a result of the determination, and may temporarily store operation processing information corresponding to the partial operation in the communication channel 102. Then, the operation processing unit 103 may read the operation processing information and accordingly may process the remaining operation excluding the partial operation.

For example, the program control unit 101 may perform a portion of or a percentage of the entire operation for the application operation such as a %. In addition, the program control unit 101 may temporarily store the operation processing information that includes operation parameters corresponding to a processing result of the a % operation. Therefore, the operation processing unit 103 may read the operation processing information from the communication channel 102 and process 1−a % of the entire operation, that is, the remaining operation other than the a %. In this fashion, processing of the operation may be completed.

Additionally, the program control unit 101 may execute the application code. Therefore, in an embodiment, the operation processing unit 103 may generate the operation processing information as preparation for processing of the application operation, and process the application operation. That is, the program control unit 101 does not process the application operation. Instead, the operation processing unit 102 may process the entire operation necessary for the application operation.

Figure 2:
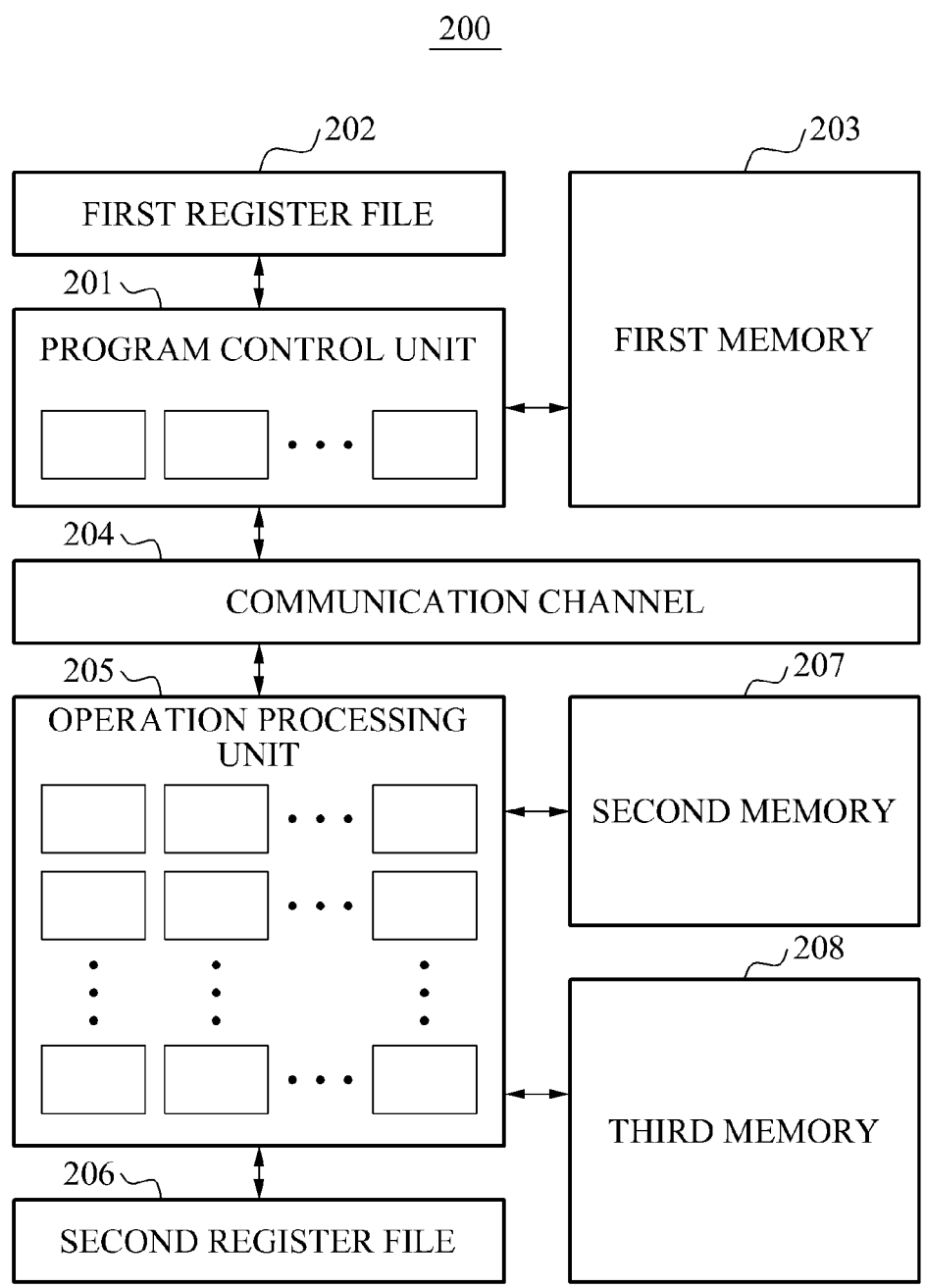
FIG. 2 illustrates an overall structure of an arithmetic processing apparatus according to example embodiments.

FIG. 2 illustrates an overall structure of an arithmetic processing apparatus 200 according to example embodiments.

In particular, FIG. 2 shows structural elements of a digital signal processor (DSP) for parallel driving of a program control unit 201 and an operation processing unit 205 included in the arithmetic processing apparatus 200.

Referring to FIG. 2, the arithmetic processing apparatus 200 may include, for example, the program control unit 201, a first register file 202, a first memory 203, a communication channel 204, the operation processing unit 205, a second register file 206, a second memory 207, and a third memory 208.

The program control unit 201 may execute an application code to drive an application. In this instance, the program control unit 201 may temporarily store, in the communication channel 204, operation processing information necessary for an application operation by executing the application code.

For example, the program control unit 201 may process a partial operation of an entire operation necessary for the application operation. In addition, the program control unit 201 may temporarily store operation processing information including operation parameters corresponding to the processed partial operation, in the communication channel 204. For example, when the program control unit 201 processes the partial operation, the operation parameters stored in the communication channel 204 may include a processing result of the processed partial operation.

Therefore, the operation processing unit 205 may read the operation processing information from the communication channel 204, thereby processing remaining operation excluding the partial operation.

Here, the term "application code" may refer to an instruction commanding processing of an operation to drive the application. The term "application operation" may refer to an operation necessary for driving the application according to the application code being executed. For example, the application code may include a conditional branch instruction, a function call, a branch instruction, and the like.

The operation processing information may include at least one selected from data necessary for processing of the application operation, an address of a memory storing the data, and an operation parameter.

As another example, the program control unit 201 may execute the application code and the operation processing unit 205 may generate operation processing information including the operation parameter as preparation for processing of the application operation. For example, the operation parameter used for the preparation may include function information, index information, and the like to be called in the application operation to be processed by the operation processing unit 205.

Therefore, the operation processing unit 205 may process the entire operation of the application operation using the operation processing information.

The first register file 202 and the first memory 203 may store the data necessary for processing of the application operation and the operation parameter that is the processing result of the application operation processed by the program control unit 201.

The communication channel 204 may be a storage medium to temporarily store the operation processing information generated by the program control unit 201 and feedback information generated by the operation processing unit 205. The communication channel 204 may include at least one storage medium.

The communication channel 204 may include a plurality of separate communication channels or lines such as a first line and a second line. The first line of the communication channel may be configured to transmit information from the operation processing unit to the program control unit and the second line of the communication channel may be configured to transmit information from the program control unit to the operation processing unit. For example, each of the first line and the second line of the communication channel 204 may include at least one of a buffer, a shared memory, a register, or a hard wire. The communication channel may be configured to provide full duplex communication between the program control unit 101 and the operation processing unit 103.

Therefore, the operation processing unit 205 may process the application operation using the operation processing information stored in the communication channel 204.

For example, the operation processing unit 205 may check whether all operation parameters necessary for the application operation to be processed are stored in the communication channel 204. When all the operation parameters are stored in the communication channel 204, the operation processing unit 205 may complete processing of the application operation using the operation parameters.

Next, the operation processing unit 205 may store the feedback information corresponding to the processing result of the application operation, in at least one of the second register file 206, the second memory 207, and the third memory 208. The second register file 206, the second memory 207, and the third memory 208 may store data used in the operation processing unit 205.

The operation processing unit 205 may store the feedback information in the communication channel 204 as necessary. For example, when the program control unit 201 needs the feedback information, the operation processing unit 205 may store the feedback information in the communication channel 204.

For example, feedback information which is a processing result of a first application operation may be necessary for a second application operation.

Therefore, the program control unit 201 may promise the operation processing unit 205 in advance that the feedback information of the first application operation is necessary. In this case, the operation processing unit 205 may complete processing of the first application operation and temporarily store the feedback information in the communication channel 204. Therefore, the program control unit 201 may process the second application operation using the feedback information stored in the communication channel 204.

As another example, when such a promise is not made, the operation processing unit 205 may determine whether the program control unit 201 needs the feedback information of the first application operation.

In addition, the operation processing unit 205 may store the feedback information in the communication channel 204 based on the determination result. For example, when a feedback flag is stored in the communication channel 204 along with the operation parameter for the first application operation, the operation processing unit 205 may determine that the program control unit 201 needs the feedback information, and may therefore temporarily store the feedback information in the communication channel 204.

In FIG. 2, the program control unit 201 and the operation processing unit 205 may share the first register file 202, the first memory 203, the second register file 206, the second memory 207, and the third memory 208. Here, the first memory 203, the second memory 207, and the third memory 208 may include an instruction cache, a data cache, a scratch pad memory, and the like.

Although the program control unit 201 has been described as using a single register file and memory in the example embodiments, the example embodiments are not limiting. That is, the program control unit 201 may use at least one register file and at least one memory. Also, although the operation processing unit 205 has been described as using a single register file and two memories in the example embodiments, the example embodiments are not limiting. Therefore, the operation processing unit 205 may use at least one register file and at least one memory.

Figure 3:
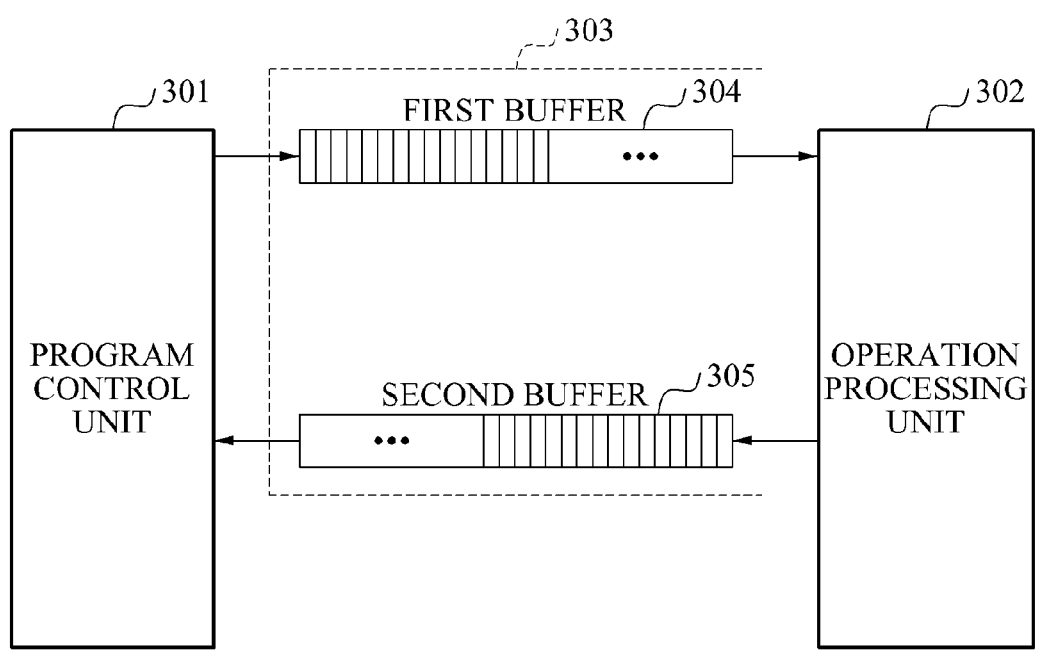
FIG. 3 illustrates a structure of a communication channel that stores operation processing information and feedback information using buffers, according to example embodiments.

FIG. 3 illustrates a structure of a communication channel 303 that stores operation processing information and feedback information using buffers, according to example embodiments.

Referring to FIG. 3, the communication channel 303 may include, for example, a first buffer 304 and a second buffer 305. For example, the first buffer 304 may include a first-in first-out (FIFO) buffer and the second buffer 305 may include a backward FIFO buffer.

A program control unit 301 may store operation processing information necessary for a first application operation to an N-th application operation, in the communication channel 304, by executing an application code.

For example, when N=5 and when the program control unit 301 has promised an operation processing unit 302 in advance that the program control unit 301 needs feedback information of a fourth application operation, the program control unit 301 may temporarily store operation processing information 1 necessary for the first application operation in the first buffer 304. Therefore, the operation processing unit 302 may read the operation processing information 1 stored in the first buffer 304 and thereby process the first application operation. Therefore, the operation processing information 1 may be emptied from the first buffer 304.

Next, before the operation processing unit 302 completes processing of the first application operation using the operation processing information 1 stored in the first buffer 304, the program control unit 301 may temporarily store operation processing information 2 necessary for a second application operation in the first buffer 304.

Here, when processing of the application operation by the operation processing unit 302 has not been completed, the program control unit 301 may store operation processing information 3 necessary for a third application operation in the first buffer 304. In this case, the operation processing information 2 and the operation processing information 3 may be stored in the first buffer 304.

In addition, the program control unit 301 may temporarily store operation processing information 4 necessary for a fourth application operation in the first buffer 304. Here, when the operation processing unit 302 is processing the third application operation after completing the first application operation and the second application operation, the program control unit 301 may wait for feedback information of the fourth application operation.

Next, when the operation processing unit 302 completes processing of the third application operation, the operation processing unit 302 may complete processing of the fourth application operation using the operation processing information 4.

Furthermore, the operation processing unit 302 may temporarily store the feedback information of the fourth application operation in the second buffer 305. Therefore, the program control unit 301 may process a fifth application operation using the feedback information of the fourth application operation stored in the second buffer 305. Thus, since the program control unit 301 operates in association with the operation processing unit 302 through the communication channel 303, the program control unit 301 may directly process a plurality of application operations in a parallel manner without having to wait for the processing result of the operation processing unit 302, except when the feedback information is necessary.

As another example, when N=5 and when the program control unit 301 has not promised the operation processing unit 302 in advance that the program control unit 301 needs the feedback information of the fourth application operation, the operation processing unit 302 may determine whether the program control unit 301 needs feedback information of an application operation to be processed, by checking the first buffer 304.

In this example, an operation of the program control unit 301 storing the operation processing information 1 to the operation processing information 3 in the first buffer 304 and an operation of the operation processing unit 302 completing processing of the first application operation to the third application operation by reading the operation processing information 1 to the operation processing information 3 stored in the first buffer 304 will not be described again since those operations are the same as when a necessity of the feedback information is promised in advance.

For example, the program control unit 301 may temporarily store the operation processing information 4 necessary for the fourth application operation in the first buffer 304. In this instance, the program control unit 301 may temporarily store a feedback flag indicating necessity of the feedback information of the fourth application operation in the first buffer 304. Therefore, the operation processing unit 303 may determine that the program control unit 301 needs the feedback information of the fourth application operation based on the feedback flag stored in the first buffer 304.

Next, the operation processing unit 302 may complete processing of the fourth application operation by reading the operation processing information 4 stored in the first buffer 304. In addition, the operation processing unit 302 may temporarily store the feedback information of the fourth application operation in the second buffer 305. Therefore, the program control unit 301 may process the fifth application operation using the feedback information of the fourth application operation stored in the second buffer 305.

Figure 4:
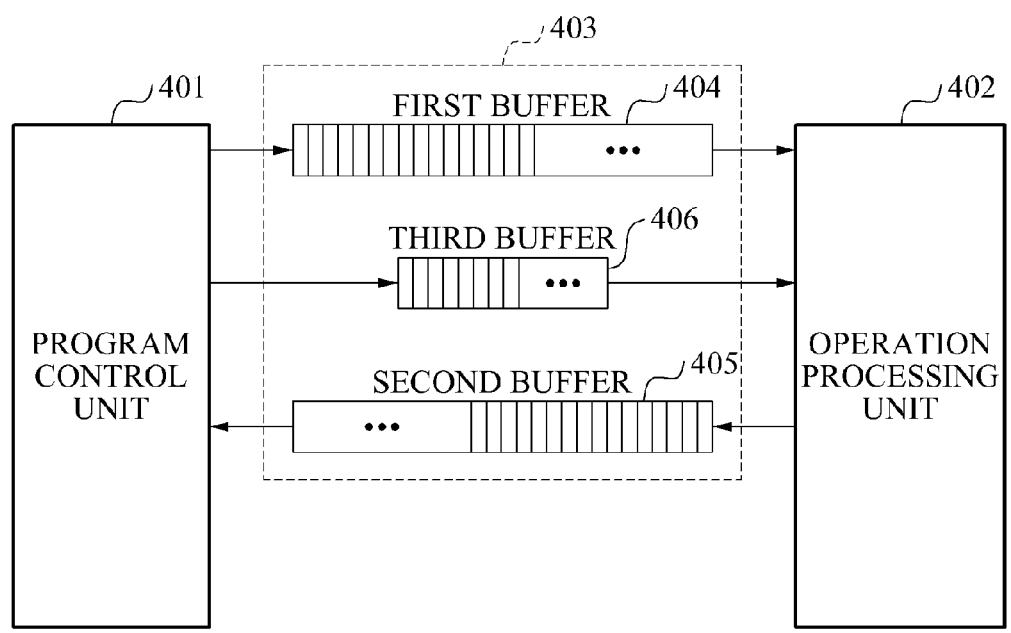
FIG. 4 illustrates a structure of a communication channel that stores operation processing information and feedback information using buffers, according to other example embodiments.

FIG. 4 illustrates a structure of a communication channel 403 that stores operation processing information and feedback information using buffers, according to other example embodiments.

In particular, the communication channel 403 shown in FIG. 4 includes two buffers to store operation processing information and one buffer to store feedback information.

According to FIG. 4, the communication channel 403 may include, for example, a first buffer 404, a second buffer 405, and a third buffer 406. For example, the first buffer 404 may include a forward FIFO buffer, the second buffer 405 may include a backward FIFO buffer, and the third buffer 406 may include a forward quick FIFO buffer.

First, a program control unit 401 may store operation processing information necessary for a first application operation to an N-th application operation, in the communication channel 403, by executing an application code.

For example, when N=5 and when the program control unit 401 has promised an operation processing unit 402 in advance that the program control unit 401 needs feedback information of a fourth application operation and that the fourth application operation is set to be preferentially processed, the program control unit 401 may temporarily store operation processing information 1 necessary for the first application operation in the first buffer 404. Here, the preferential processing may be preset when the program control unit 401 needs to promptly check the feedback information of the fourth application operation to process a fifth application operation.

That is, the program control unit 401 may temporarily store the operation processing information 1 necessary for the first application operation in the communication channel 404. Therefore, the operation processing unit 402 may read the operation processing information 1 stored in the first buffer 404 and thereby process the first application operation. Therefore, the operation processing information 1 may be emptied from the first buffer 404.

Next, before the operation processing unit 402 completes processing of the first application operation using the operation processing information 1 stored in the first buffer 404, the program control unit 401 may temporarily store operation processing information 2 necessary for a second application operation in the first buffer 404.

Here, when processing of the first application operation is not completed by the operation processing unit 402, the program control unit 401 may store operation processing information 3 necessary for a third application operation in the first buffer 404. Therefore, the operation processing information 2 and the operation processing information 3 may be stored in the first buffer 404.

In addition, the program control unit 401 may temporarily store operation processing information 4 necessary for a fourth application operation in the third buffer 406. Here, the operation processing unit 402 may check the first buffer 404 and the third buffer 406 to process the third application operation after completing the first application operation and the second application operation in sequence. Therefore, the operation processing unit 402 may confirm that the operation processing information 3 is stored in the first buffer 404 and the operation processing information 4 is stored in the third buffer 406.

Since the third buffer 406 stores the operation processing information necessary for an application operation set to be preferentially processed, the program control unit 402 may process the fourth application operation by reading the operation processing information 4 from the third buffer 406. In addition, the operation processing unit 402 may temporarily store the feedback information of the fourth application operation in the second buffer 405. Next, the operation processing unit 402 may process the third application operation by reading the operation processing information 3 from the first buffer 404.

Therefore, the program control unit 401 may read the feedback information of the fourth application operation from the second buffer 405 and temporarily store operation processing information 5 necessary for the fifth application operation in the first buffer 404. Accordingly, the operation processing unit 402 may read the operation processing information 5 from the first buffer 404 and thereby complete processing of the fifth application operation.

Thus, the operation processing unit 402 may quickly provide the feedback information to the program control unit 401, by first processing the application operation set to be preferentially processed using the third buffer 405. Consequently, the program control unit 401 may reduce a wait time for feedback information of a previous application operation to process a next application operation.

As another example, when N=5 and when the program control unit 401 has not promised the operation processing unit 402 in advance that the program control unit 401 needs the feedback information of the fourth application operation, the operation processing unit 402 may determine whether the program control unit 401 needs feedback information of an application operation to be processed, by checking the first buffer 404 and the third buffer 406. Here, it is presumed that the fourth application operation is set to be preferentially processed.

In this example, an operation of the program control unit 401 storing the operation processing information 1 to 3 in the first buffer 404 and an operation of the operation processing unit 402 completing processing of the first application operation to the third application operation by reading the operation processing information 1 to 3 stored in the first buffer 404 will not be described again since those operations are the same as when necessity of the feedback information is promised in advance in FIG. 4.

For example, the program control unit 401 may temporarily store the operation processing information 4 necessary for the fourth application operation in the third buffer 406. Here, the program control unit 401 may temporarily store a feedback flag indicating that the feedback information of the fourth application operation is necessary, in the third buffer 406. In this case, the operation processing unit 402 may determine that the program control unit 401 needs the feedback information of the fourth application operation based on the feedback flag stored in the third buffer 406.

Next, the operation processing unit 402 may read the operation processing information 4 stored in the third buffer 406, thereby completing processing of the fourth application operation. Also, the operation processing unit 402 may temporarily store the feedback information of the fourth application operation in the second buffer 405. Therefore, the program control unit 401 may process the fifth application operation using the feedback information of the fourth application operation stored in the second buffer 405.

As described with reference to FIG. 4, when a prompt check of feedback information of an application operation is necessary, the program control unit 401 may temporarily store, in the third buffer 406, operation processing information of an application operation set to be preferentially processed. When a prompt check of the feedback information of the application operation is unnecessary, the program control unit 401 may temporarily store the operation processing information of the application operation in the first buffer 404.

Figure 5:
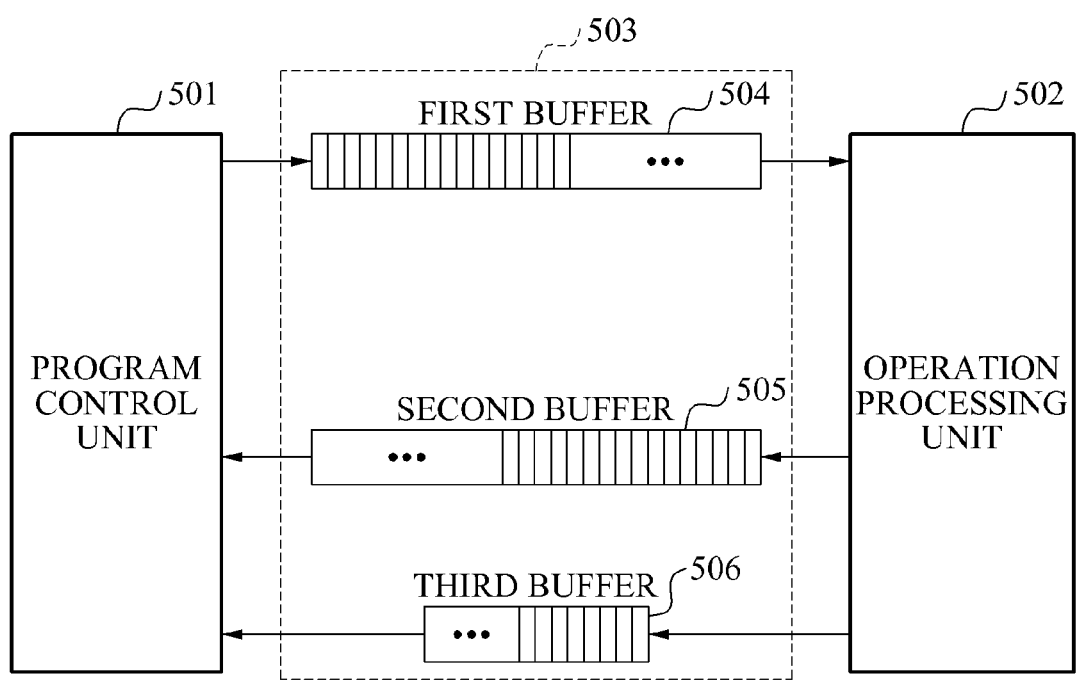
FIG. 5 illustrates a structure of a communication channel that stores operation processing information and feedback information using buffers, according to yet other example embodiments.

FIG. 5 illustrates a structure of a communication channel 503 that stores operation processing information and feedback information using buffers, according to yet other example embodiments.

In particular, the communication channel 503 shown in FIG. 5 includes one buffer to store operation processing information and two buffers to store feedback information.

Referring to FIG. 5, the communication channel 503 may include, for example, a first buffer 504, a second buffer 505, and a third buffer 506. For example, the first buffer 504 may include a forward FIFO buffer, the second buffer 505 may include a backward FIFO buffer, and the third buffer 506 may include a backward quick FIFO buffer.

A program control unit 501 may store operation processing information necessary for a first application operation to an N-th application operation, in the communication channel 503, by executing an application code.

For example, when N=5 and when the program control unit 501 has promised an operation processing unit 502 in advance that the program control unit 501 needs feedback information of a second application operation and a fourth application operation and that the fourth application operation is set to be preferentially processed, the program control unit 501 may temporarily store operation processing information 1 necessary for the first application operation in the first buffer 504. Here, it may be presumed that the program control unit 501 processes a fifth application operation using the feedback information of the second application operation and the fourth application operation.

The program control unit 501 may temporarily store operation processing information 1 necessary for the first application operation in the first buffer 504. Therefore, the operation processing unit 502 may read the operation processing information 1 stored in the first buffer 504 and thereby process the first application operation. Accordingly, the operation processing information 1 may be emptied from the first buffer 504.

Next, before the operation processing unit 502 completes processing of the first application operation using the operation processing information 1 stored in the first buffer 504, the program control unit 501 may temporarily store operation processing information 2 necessary for a second application operation in the first buffer 504. Also, the program control unit 502 may temporarily store operation processing information 3 necessary for a third application operation and operation processing information 4 necessary for the fourth application operation, in the first buffer 504.

Therefore, the operation processing unit 502 may sequentially complete processing of the second application operation and the third application operation. In addition, the operation processing unit 502 may temporarily store feedback information of the second application operation in the second buffer 505.

Next, the operation processing unit 502 may complete processing of the fourth application operation and temporarily store feedback information of the fourth application operation in the third buffer 506. Therefore, the program control unit 501 may read the feedback information of the second application operation from the second buffer 505 and read the fourth application operation from the third buffer 506, thereby generating operation processing information 5 necessary for the fifth application operation.

In addition, the program control unit 501 may temporarily store the operation processing information 5 in the first buffer 504. The operation processing unit 502 may complete processing of the fifth application operation using the operation processing information 5.

As another example, when N=5 and when the program control unit 501 has not promised the operation processing unit 502 in advance that the program control unit 501 needs the feedback information of the second application operation and the fourth application operation, the operation processing unit 502 may determine whether the program control unit 501 needs feedback information of an application operation to be processed, by checking the first buffer 504.

Here, it is presumed that the program control unit 501 processes the fifth application operation using the operation processing information 1 to the operation processing information 4 and that the fourth application operation is set to be preferentially processed.

Here, an operation of the program control unit 501 storing the operation processing information 1 to 4 in the first buffer 504 and an operation of the operation processing unit 502 completing processing of the first application operation to the fourth application operation by reading the operation processing information 1 to the operation processing information 4 stored in the first buffer 504 will not be described again since those operations are the same as when necessity of the feedback information is promised in advance in FIG. 5.

For example, the program control unit 501 may temporarily store a feedback flag of the second application operation in the first buffer 504 along with the operation processing information 2. The operation processing unit 502 may determine that the program control unit 501 needs the feedback information of the second application operation based on the feedback flag of the second application operation stored in the first buffer 504. Additionally, the operation processing unit 502 may temporarily store the feedback information of the second application operation in the second buffer 505.

In the same manner, the program control unit 501 may temporarily store a feedback flag of the third application operation along with operation processing information 3, in the first buffer 504. Therefore, the operation processing unit 502 may determine that the program control unit 501 needs the feedback information of the fourth application operation, based on the feedback flag of the fourth application operation stored in the first buffer 504. Additionally, the operation processing unit 504 may temporarily store the feedback information of the fourth application operation in the third buffer 506.

Therefore, the program control unit 501 may read the feedback information of the second application operation and the third application operation from the second buffer 505 and the third buffer 506, respectively, and thereby generate the operation processing information 5 necessary for the fifth application operation. Additionally, the program control unit 501 may store the operation processing information 5 in the first buffer 504. Therefore, the operation processing unit 502 may complete processing of the fifth application operation using the operation processing information 5.

Figure 6:
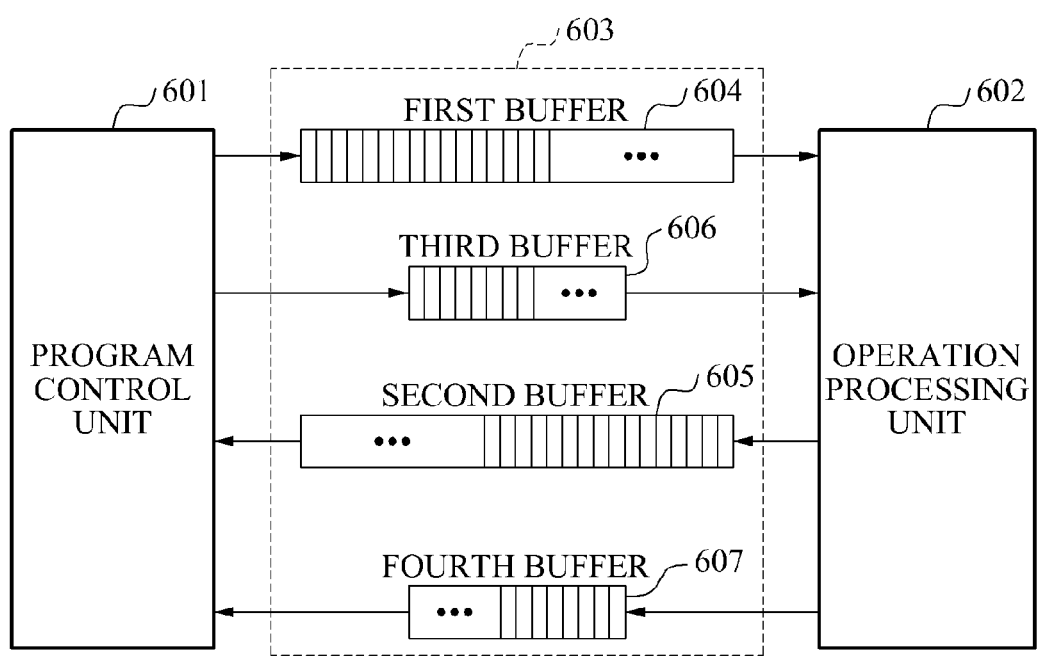
FIG. 6 illustrates a structure of a communication channel that stores operation processing information and feedback information using buffers, according to still other example embodiments.

FIG. 6 illustrates a structure of a communication channel 603 that stores operation processing information and feedback information using buffers, according to still other example embodiments.

In particular, the communication channel 603 shown in FIG. 6 includes two buffers to store operation processing information and two buffers to store feedback information.

Referring to FIG. 6, the communication channel 603 may include, for example, a first buffer 604, a second buffer 605, a third buffer 606, and a fourth buffer 607. For example, the first buffer 604 may include a forward FIFO buffer, the second buffer 605 may include a backward FIFO buffer, the third buffer 606 may include a forward quick FIFO buffer, and the fourth buffer 607 may include a backward quick FIFO.

A program control unit 601 may store operation processing information necessary for a first application operation to an N-th application operation, in the communication channel 603, by executing an application code.

For example, when N=6 and when the program control unit 601 has promised an operation processing unit 602 in advance that the program control unit 601 needs feedback information of a second application operation and fourth application operation and that the fourth application operation is set to be preferentially processed, the program control unit 601 may temporarily store operation processing information 1 necessary for the first application operation in the first buffer 604. Here, it may be presumed that the program control unit 601 processes a fifth application operation using the feedback information of the fourth application operation, and processes a sixth application operation using the feedback information of the second application operation.

In detail, the program control unit 601 may temporarily store the operation processing information 1 necessary for the first application operation in the first buffer 604. The operation processing unit 602 may read the operation processing information 1 stored in the first buffer 604 and thereby process the first application operation. Accordingly, the operation processing information 1 may be emptied from the first buffer 604.

Before the operation processing unit 602 completes processing of the first application operation using the operation processing information 1 stored in the first buffer 604, the program control unit 601 may temporarily store the operation processing information 2 necessary for the second application operation in the first buffer 604.

Also, the program control unit 601 may temporarily store operation processing information 3 necessary for a third application operation in the first buffer 604. When processing of the first application operation is not completed by the operation processing unit 602, the operation processing information 2 and the operation processing information 3 may be sequentially stored in the first buffer 604.

Next, the program control unit 601 may store operation processing information 4 in the third buffer 606 as soon as the storing of the operation processing information 3 in the first buffer 604 has occurred. Therefore, the first buffer 604 may store the operation processing information 2 and the operation processing information 3 while the third buffer 606 stores the operation processing information 4.

When the operation processing unit 602 completes processing of the first application operation, the operation processing unit 602 may check the first buffer 604 and the third buffer 606. In addition, the operation processing unit 602 may read the operation processing information 4 from the third buffer 606, thereby generating feedback information of the fourth application operation, which is set to be preferentially processed. Next, the operation processing unit 602 may temporarily store the feedback information of the fourth application operation in the fourth buffer 607. That is, the operation processing unit 602 may process the fourth application operation preferentially to the second application operation and the third application operation.

After storing the feedback information of the fourth application operation in the fourth buffer 607, the operation processing unit 602 may read the operation processing information 2 from the first buffer 604 and thereby process the second application operation.

Here, the program control unit 601 may start generation of the operation processing information 5 necessary for the fifth application operation while the operation processing unit 602 is processing the second application operation. That is, the program control unit 601 may start generation of the operation processing information 5 using the feedback information of the fourth application operation stored in the fourth buffer 607. Accordingly, the fourth buffer 607 may be emptied.

Here, before the program control unit 601 completes generation of the operation processing information 5, the operation processing unit 602 may complete processing of the second application operation. Therefore, the operation processing unit 602 may temporarily store the feedback information of the second application operation in the second buffer 605.

After completing processing of the second application operation, the operation processing unit 602 may read the operation processing information 3 from the first buffer 604 and thereby process the third application operation. Here, the program control unit 601 may complete generation of the operation processing information 5 while the operation processing unit 602 is processing the third application operation. Therefore, the program control unit 601 may temporarily store the operation processing information 5 in the first buffer 604.

Next, after completing processing of the third application operation, the operation processing unit 602 may read the operation processing information 5 from the first buffer 604 and thereby process the fifth application operation.

Here, the program control unit 601 may generate operation processing information 6 necessary for the sixth application operation while the operation processing unit 602 is processing the fifth application operation. That is, the program control unit 601 may read the feedback information of the second application operation from the second buffer 605 and thereby generate the operation processing information 6. In addition, the program control unit 601 may temporarily store the operation processing information 6 in the first buffer 604.

Therefore, the operation processing unit 602 may complete processing of the sixth application operation using the operation processing information 6. Thus, since the program control unit 601 and the operation processing unit 602 process the plurality of application operations in parallel using the first buffer 604 to the fourth buffer 607, a delay caused during processing of an application operation demanding feedback information may be reduced. As a result, application execution time may be further reduced.

As another example, when N=6 and when the program control unit 601 has not promised in advance that the program control unit 601 needs the feedback information of the second application operation and the fourth application operation, the operation processing unit 602 may determine whether the program control unit 601 needs feedback information of an application operation to be processed, by checking the first buffer 604 and the third buffer 606.

Here, it may be presumed that the program control unit 601 processes the fifth application operation using the feedback information of the fourth application operation and processes the sixth application operation using the feedback information of the second application operation, and that the fourth application operation is set to be preferentially processed.

First, the program control unit 601 may temporarily store operation processing information 1 necessary for the first application operation in the first buffer 604. Therefore, the operation processing unit 602 may read the operation processing information 1 stored in the first buffer 604 and thereby process the first application operation. Accordingly, the operation processing information 1 may be emptied from the first buffer 604.

Before the operation processing unit 602 completes processing of the first application operation using the operation processing information 1 stored in the first buffer 604, the program control unit 601 may temporarily store the operation processing information 2 necessary for the second application operation in the first buffer 604. Here, the program control unit 601 may temporarily store a feedback flag of the second application operation in the first buffer 604 along with the operation processing information 2.

In addition, the program control unit 601 may temporarily store the operation processing information 3 temporarily store the third application operation in the first buffer 604. For example, when processing of the first application operation is not completed by the operation processing unit 602, the feedback flag of the second application operation, the operation processing information 2, and the operation processing information 3 may be sequentially stored in the first buffer 604.

Next, as soon as storing the operation processing information 3 in the first buffer 604, the program control unit 601 may store the operation processing information 4 necessary for the fourth application operation in the third buffer 606. In this instance, the program control unit 601 may temporarily store a feedback flag of the fourth application operation in the third buffer 606 along with the operation processing information 4.

Therefore, the first buffer 604 may store the feedback flag of the second application operation, the operation processing information 2, and the third operation processing information 3. The third buffer 606 may store the feedback flag of the fourth application operation and the operation processing information 4.

When the operation processing unit 602 completes processing of the first application operation, the operation processing unit 602 may check the first buffer 604 and the third buffer 606. The operation processing unit 602 may read the feedback flag of the fourth application operation from the third buffer 606 and determine that the program control unit 601 needs the feedback information of the fourth application operation.

Accordingly, the operation processing unit 602 may read the operation processing information 4 from the third buffer 606 and thereby generate the feedback information of the fourth application operation, which is set to be preferentially processed. Additionally, the operation processing unit 602 may temporarily store the feedback information of the fourth application operation in the fourth buffer 607. That is, the operation processing unit 602 may process the fourth application operation preferentially to the second application operation and the third application operation.

Here, after storing the feedback information of the fourth application operation in the fourth buffer 607, the operation processing unit 602 may read the feedback flag of the second application operation from the first buffer 604 and thereby determine that the program control unit 601 needs the feedback information of the second application operation. Accordingly, the operation processing unit 602 may read the operation processing information 2 from the first buffer 604 and thereby process the second application operation.

Here, the program control unit 601 may start generation of the operation processing information 5 necessary for the fifth application operation while the operation processing unit 602 is processing the second application operation. That is, the program control unit 601 may start generation of the operation processing information 5 using the feedback information of the fourth application operation stored in the fourth buffer 607. Accordingly, the fourth buffer 607 may be emptied.

Here, before the program control unit 601 completes generation of the operation processing information 5, the operation processing unit 602 may complete processing of the second application operation. Therefore, the operation processing unit 602 may temporarily store the feedback information of the second application operation in the second buffer 605.

After completing processing of the second application operation, the operation processing unit 602 may read the operation processing information 3 from the first buffer 604 and thereby process the third application operation. Here, the program control unit 601 may complete generation of the operation processing information 5 while the operation processing unit 602 is processing the third application operation. Therefore, the program control unit 601 may temporarily store the operation processing information 5 in the first buffer 604.

Next, after completing processing of the third application operation, the operation processing unit 602 may read the operation processing information 5 from the first buffer 604 and thereby process the fifth application operation.

Here, the program control unit 601 may generate operation processing information 6 necessary for the sixth application operation while the operation processing unit 602 is processing the fifth application operation. That is, the program control unit 601 may read the feedback information of the second application operation from the second buffer 605 and thereby generate the operation processing information 6. In addition, the program control unit 601 may temporarily store the operation processing information 6 in the first buffer 604. Accordingly, the operation processing unit 602 may complete processing of the sixth application operation using the operation processing information 6.

In the example embodiments of FIGS. 4 to 6, it is presumed that the fourth application operation is set to be preferentially processed. However, since this is only by way of example, the operation processing unit may determine whether preferential processing is set with respect to an application operation to be processed.

For example, when preferential processing is necessary, the program control unit may temporarily store a preferential operation flag in the communication channel along with the operation processing information of the corresponding application operation. Therefore, the operation processing unit may determine whether preferential processing is set with respect to the application operation to be processed, by checking the preferential operation flag stored in the communication channel.

With reference to FIGS. 3 to 6, the communication channel has been described as temporarily storing at least one of operation processing information and feedback information using buffers. However, the communication channel is not limited to the example embodiments, and may alternatively store data in at least one of a shared memory, a register, and a hardwire.

Figure 7:
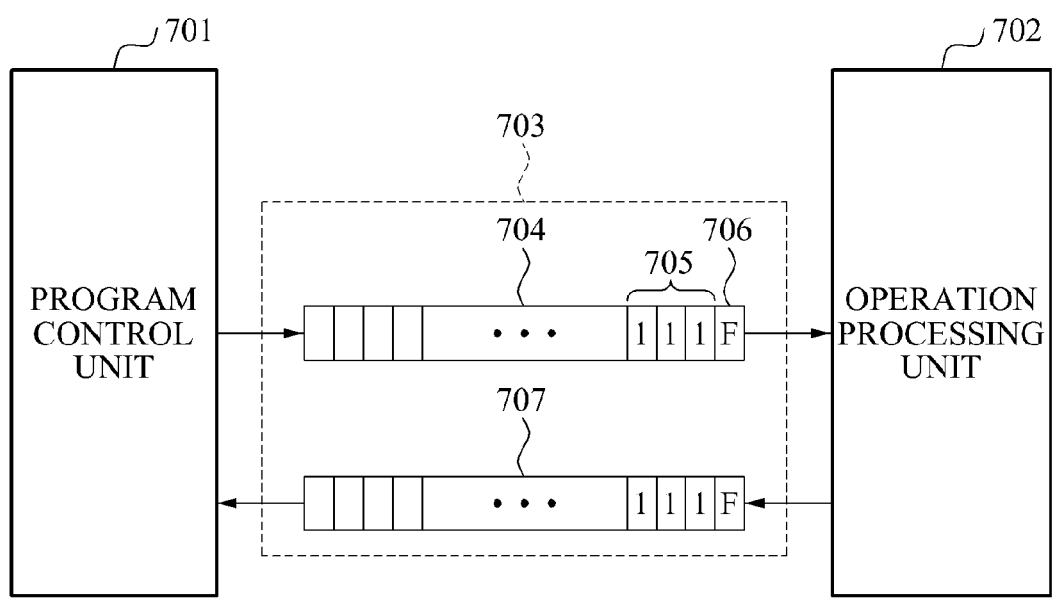
FIG. 7 illustrates an operation of determining necessity of feedback information by an operation processing unit shown in FIGS. 2 to 6 using the feedback flag.

FIG. 7 illustrates an operation of determining necessity of feedback information by an operation processing unit shown in FIGS. 2 to 6 using the feedback flag.

Referring to FIG. 7, a program control unit 701 may temporarily store operation processing information necessary for a first application operation in a communication channel 703, by executing an application code.

For example, the program control unit 701 may temporarily store operation parameters 705 necessary for the first application operation in a first buffer 704 so that an operation processing unit 702 completes processing of the first application operation. Here, the program control unit 701 may store a feedback flag F 706 of the first application operation along with the operation parameters 705 in the first buffer 704.

Therefore, the operation processing unit 702 may check the first buffer 704 and determine that the program control unit 701 needs feedback information of the first application operation based on the feedback flag F 706 of the first application operation.

In detail, the operation processing unit 702 may check the first buffer 704 to determine whether all operation parameters for processing of the first application operation are stored in the first buffer 704. When all operation parameters are stored, the operation processing unit 702 may complete processing of the first application operation using the operation parameters 705. In addition, the operation processing unit 702 may temporarily store the feedback information of the first application operation in a second buffer 707.

In the foregoing description with reference to FIGS. 3 to 7, either: 1) the program control unit and the operation processing unit may process the application operations in a sharing manner; or 2) the program control unit may execute the application code while the operation processing unit processes the entire operation necessary for the application operations.

Figure 8:
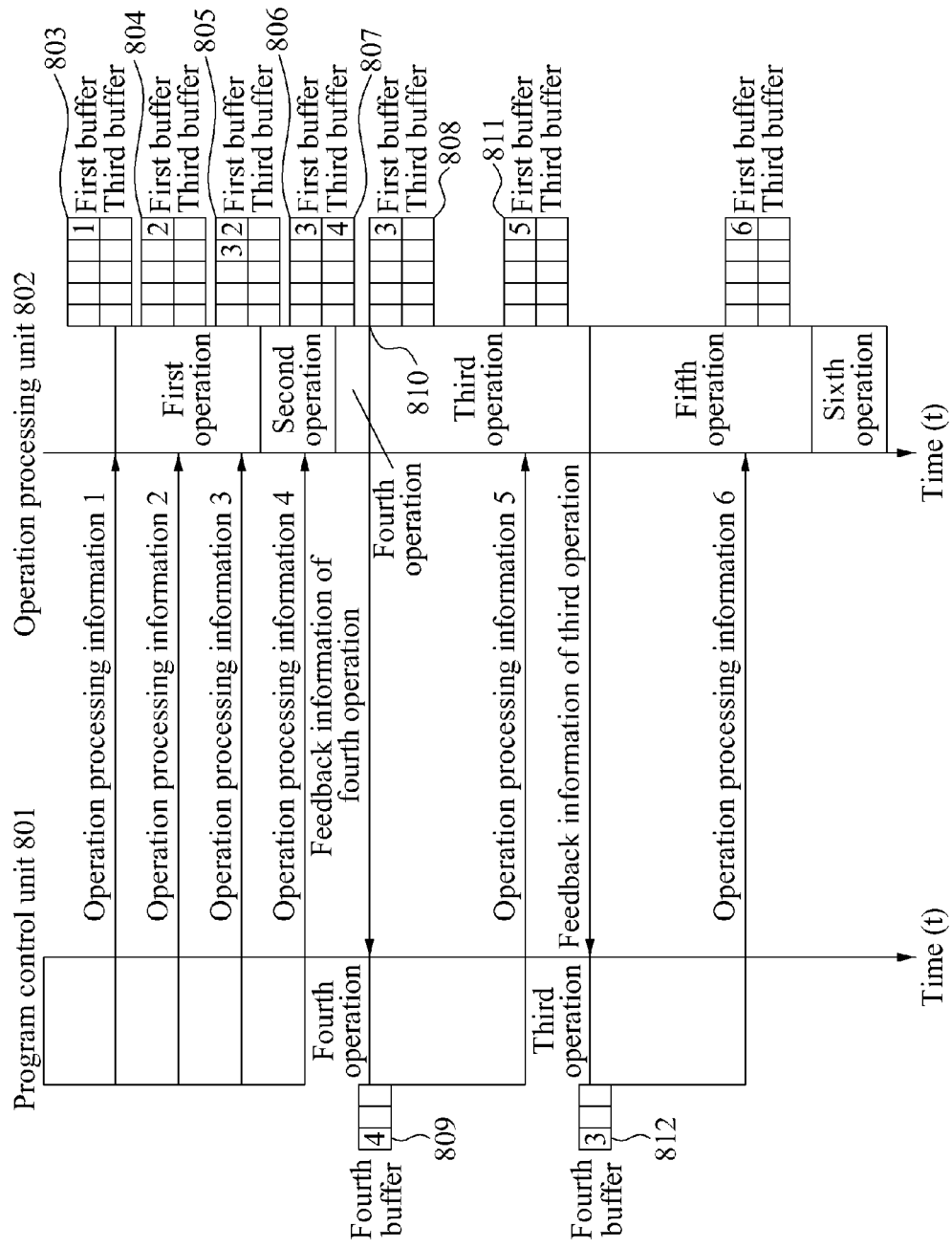
FIG. 8 illustrates an operation of executing an application code by a program control unit and processing an application operation by an operation processing unit, according to example embodiments.

FIG. 8 illustrates an operation of executing application codes by a program control unit 801 and processing an application operation by an operation processing unit 802, according to example embodiments.

In particular, according to FIG. 8, the program control unit 801 may execute the application codes necessary for six application operations while the operation processing unit 802 processes the six application operations.

In FIG. 8, a communication channel may include a first buffer to a fourth buffer. The first buffer may include a forward FIFO buffer, a second buffer may include a backward FIFO buffer, a third buffer may include a forward quick FIFO buffer, and the fourth buffer may include a backward quick FIFO buffer.

It is presumed that fourth application operation is set to be preferentially processed. It is also presumed that the program control unit 801 promised the operation processing unit 802 that the program control unit 801 needs feedback information of the third application operation and feedback information of the fourth application operation. It is also presumed that fifth application operation needs the feedback information of the fourth application operation and a sixth application operation needs the feedback information of the third application operation.

Referring to FIG. 8, the program control unit 801 may prepare for processing of the first application operation by executing a first application code. For example, the program control unit 801 may generate operation parameters necessary for the operation processing unit 802 to process the first application operation. The operation parameters used for the preparation may include function information, index information, and the like to be called in the first application operation.

The program control unit 801 may temporarily store, in the first buffer 803, operation processing information 1, which includes at least one selected from operation parameters necessary for processing of the first application operation, data necessary for processing of the first application operation, and an address of a memory storing the data.

The operation processing unit 802 may check the first buffer 803 and the third buffer and accordingly confirm that the operation processing information 1 is temporarily stored in the first buffer 803. Additionally, the operation processing unit 802 may read the operation processing information 1 from the first buffer 803 and thereby process the first application operation. Accordingly, the first buffer 803 may be emptied.

As soon as the operation processing information 1 is temporarily stored in the first buffer 803, the program control unit 801 may execute a second application code to prepare for processing of a second application operation. Therefore, the program control unit 801 may temporarily store operation processing information 2 in a first buffer 804. As soon as the operation processing information 2 is temporarily stored in the first buffer 804, the program control unit 801 may execute a third application code to prepare for processing of a third application operation.

Accordingly, the program control unit 801 may temporarily store the operation processing information 3 in a first buffer 805. Here, when processing of the first application operation is not completed by the operation processing unit 802, the first buffer 805 may temporarily store the operation processing information 2 and the operation processing information 3. Next, when processing of the first application operation is completed, the operation processing unit 802 may read the operation processing information 2 and thereby process the second application operation. As a result, the operation processing information 2 may be emptied from a first buffer 806 whereas the operation processing information 3 remains in the first buffer 806.

As soon as the operation processing information 3 is temporarily stored in the first buffer 805, the program control unit 801 may execute a fourth application code as preparation for processing of the fourth application operation. Here, the program control unit 801 may temporarily store operation processing information 4 in a third buffer 807.

Here, at the moment when the operation processing information 4 is temporarily stored in the third buffer 807, the operation processing unit 802 may be processing the second application operation. Therefore, the operation processing information 3 may be stored in the first buffer 806 while the operation processing information 4 may be stored in the third buffer 807.

The operation processing information 5 may be processed using feedback information of the fourth application operation. Accordingly, the program control unit 801 may wait until processing of the fourth application operation is completed. For example, the program control unit 801 may wait, checking a fourth buffer 809 until the feedback information of the fourth application operation is stored in the fourth buffer 809.

When processing of the second application operation is completed, the operation processing unit 802 may check the first buffer 806 and the third buffer 807. The third buffer 807 may be adapted to store operation processing information of an application operation set to be preferentially processed. That is, the third buffer may be adapted to store operation processing information that needs to be preferentially processed to the operation processing information stored in the first buffer.

Accordingly, the operation processing unit 802 may read the operation processing information 4 from the third buffer 807 and thereby process the fourth application operation. Thus, the third buffer 807 may be emptied.

The operation processing unit 802 may temporarily store the feedback information of the fourth application operation in the fourth buffer 809. Here, the fourth buffer 809 may be adapted to store feedback information of an application operation set to be preferentially processed. That is, the fourth buffer 809 may be adapted to store feedback information of an application operation that needs to be promptly checked by the program control unit 801 for processing of a next application operation.

As soon as the feedback information of the fourth application operation is stored in the fourth buffer 809, the operation processing unit 802 may read the operation processing information 3 from a first buffer 810 and thereby process the third application operation.

Here, before the operation processing unit 802 completes processing of the third application operation, the program control unit 801 may read the feedback information of the fourth application operation from the fourth buffer 809 to prepare for processing of the fifth application operation. In addition, the program control unit 801 temporarily stores operation processing information 5 in a first buffer 811. Next, the program control unit 801 may wait until feedback information of the third application operation is stored in a fourth buffer 812.

When processing of the third application operation is completed, the operation processing unit 802 may temporarily store the feedback information of the third application operation in the fourth buffer 812. Here, the operation processing unit 802 may temporarily store the feedback information of the third application operation in a second buffer (not shown).

Therefore, the program control unit 801 may execute a sixth application code and read the feedback information of the third application operation from the fourth buffer 812 to prepare for processing of the sixth application operation. Also, the program control unit 801 may temporarily store operation processing information 6 in a first buffer 813.

Here, when the fifth application operation is being processed in the operation processing unit 802, the operation processing unit 802 may complete processing of the fifth application operation and then complete processing of the sixth application operation using the operation processing information 6.

FIG. 9 illustrates an operation of accelerating execution of an application in an arithmetic processing apparatus according to example embodiments.

In the example embodiments of FIG. 9, it is presumed that the arithmetic processing apparatus executes a video decoding application that processes one macro block.

Referring to FIG. 9, a program control unit 901 may execute an application code and an application operation for executing the video decoding application for 714 cycles. An operation processing unit 902 may process an application operation for executing the video decoding application for 536 cycles.

When processing the application operation according to the application code being executed, the program control unit 901 may operate simultaneously with the operation processing unit 902 in parallel, rather than alternately with the operation processing unit 902. Accordingly, execution of the application operation may be accelerated.

For example, the program control unit 901 may process an application operation for 102 cycles and then immediately process another application operation for 129 cycles without waiting until the operation processing unit 902 processes an application operation for 21 cycles.

In the same manner, the operation processing unit 902 may process an application operation for 21 cycles and then immediately process another application operation for 7 cycles without waiting until the program control unit 901 processes an application operation for 102 cycles. Accordingly, a delay caused during processing of an application operation may be reduced or removed, thereby reducing the application execution time.

Figure 10:
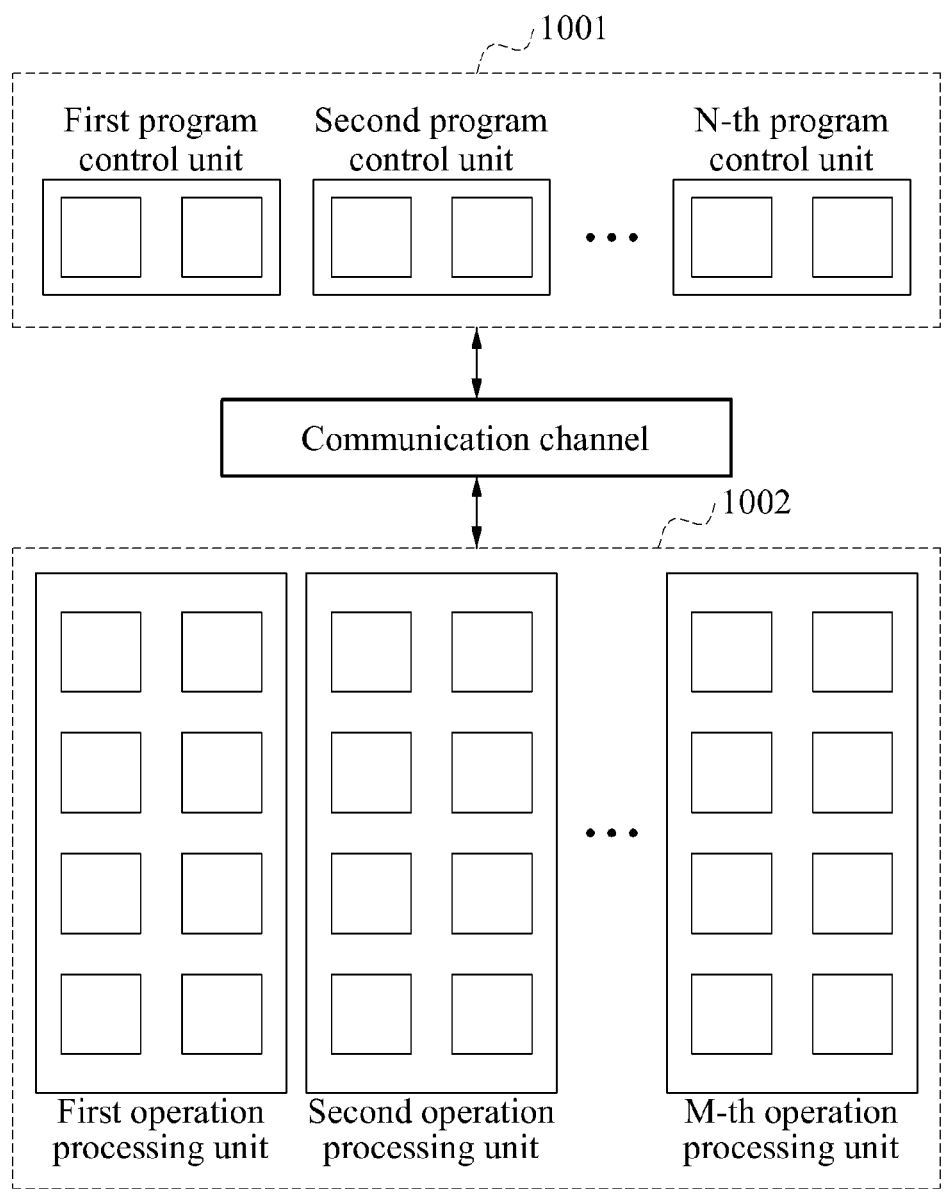
FIG. 10 illustrates a structure of an arithmetic processing apparatus including at least one program control unit, according to example embodiments.

FIG. 10 illustrates a structure of an arithmetic processing apparatus 1000 including at least one program control unit, according to example embodiments In the example embodiments of FIG. 10, the arithmetic processing apparatus 1000 may include, for example, at least one program control unit 1001, at least one operation processing unit 1002, and a communication channel 1003.

For example, an N-number of program control units may prepare processing of a first application operation to an N-th application operation by executing a first application code to an N-th application code in a sharing manner. In addition, the N-number of program control units may temporarily store operation processing information 1 to operation processing information N in the communication channel.

An M-number of operation processing units may process the first application operation to the N-th application operation in parallel in a sharing manner. In this case, the M-number of operation processing units may process the first application operation to the N-th application operation using the operation processing information 1 to the operation processing information N. Here, N may be equal to or different from M. That is, the number of the operation processing units may be equal to or different from the number of the program control units.

The M-number of operation processing units may temporarily store feedback information in the communication channel as necessary. Since the operation of storing the feedback information in the communication channel as necessary is the same as the operation of storing the feedback information in the communication channel by the operation processing unit of FIG. 2, the operation will not be repeatedly described.

As another example, the N-number of program control units may execute the first application code to the N-th application code in a sharing manner. In addition, the N-number of program control units may process partial operation of an application operation corresponding to the application code executed by the N-number of program control units. Also, the N-number of program control units may temporarily store operation processing information including a processing result of the partial operation in the communication channel.

Therefore, the M-number of operation processing units may process remaining operation, excluding the partial operation processed by the N-number of program control units, with respect to the N-number of application operations. Thus, according to an increase in the number of the program control units and the operation processing units executing the application codes and the application operations, the application execution time may be reduced, consequently increasing the efficiency.

Figure 11:
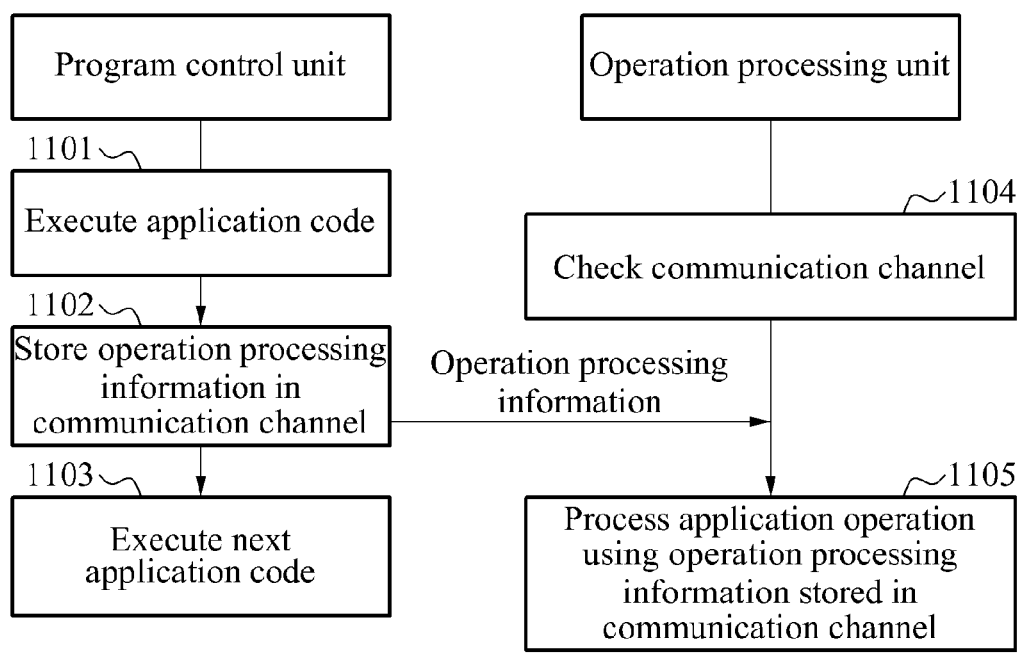
FIG. 11 illustrates an arithmetic processing method according to example embodiments.

FIG. 11 illustrates an arithmetic processing method according to example embodiments.

The arithmetic processing method of FIG. 11 may be performed by the arithmetic processing apparatus of FIG. 2, as an example, although other apparatuses may equally be used to perform the method. The arithmetic processing apparatus may include a program control unit and an operation processing unit.

Referring to FIG. 11, in operation 1101, the program control unit may execute an application code.

The application code refers to an instruction commanding processing of an operation to drive the application. For example, the application code may include a conditional branch instruction, a function call, a branch instruction, and the like.

In operation 1102, the program control unit may temporarily store operation processing information necessary for an application operation in a communication channel.

The application operation may be an operation necessary for driving an application according to the application code being executed. The operation processing information may include at least one selected from data necessary for processing of the application operation, an address of a memory storing the data, and an operation parameter.

For example, the program control unit may prepare for processing of the application operation based on execution of the application code. That is, the program control unit may prepare operation parameters necessary for processing of the application operation in the operation processing unit and temporarily store the operation parameters. For example, the operation parameters used for the preparation may include function information, index information, and the like to be called in the application operation to be processed by the operation processing unit.

As another example, the program control unit may process partial operation of an entire operation of the application operation based on the application code being executed. In addition, the program control unit may temporarily store operation parameters corresponding to the processed partial operation, in the communication channel. For example, when the program control unit processes the partial operation, the operation parameters stored in the communication channel may include a processing result of the processed partial operation.

Here, the program control unit may store operation processing information in the communication channel depending on presence of an overflow of the communication channel. For example, when an overflow is present, the program control unit may wait until a storage space of the communication channel is secured and then store the operation processing information in the communication channel.

In operation 1103, after the operation processing information is stored in the communication channel, the program control unit may execute a next application code. Additionally, the program control unit may temporarily store, in the communication channel, operation processing information necessary for a next application operation. That is, the program control unit may execute the next application code without waiting until the operation processing unit completes processing of the application operation.

For example, after operation processing information 1 necessary for a first application operation is temporarily stored in the communication channel, the program control unit may temporarily store operation processing information 2 necessary for a second application operation in the communication channel before processing of the first application operation is completed. Here, the second application operation may refer to an operation to be processed after the first application operation.

Next, in operation 1104, the operation processing unit may check whether the operation processing information is stored in the communication channel.

The communication channel may refer to a storage space to temporarily store at least one of operation processing information and feedback information. For example, the communication channel may include at least one selected from a buffer, a shared memory, a register, and a hardwire. In an embodiment, the communication channel 102 may include a plurality of separate communication channels or lines such as a first line and a second line, where each of the first line and the second line may be any of a buffer, a shared memory, a register, or a hardwire.

For example, when the program control unit stores the operation processing information in the communication channel, the operation processing unit may confirm a stored state of the operation processing information by monitoring the communication channel. Also, the operation processing unit may check whether all the operation parameters necessary for the application operation are stored in the communication channel.

Accordingly, in operation 1105, the operation processing unit may read the operation processing information from the communication channel and thereby process the application operation.

For example, when the program control unit only prepares for processing of the application operation by executing the application code, the operation processing unit may process the entire operation of the application operation using the operation processing information.

As another example, when the program control unit processes the partial operation of the application operation, the operation processing unit may process remaining operation excluding the partial operation using the operation processing information.

The operation processing unit may store a processing result of the application operation in at least one of a register file and a memory. Here, the operation processing unit may feedback the processing result to the program control unit through the communication channel.

Figure 12:
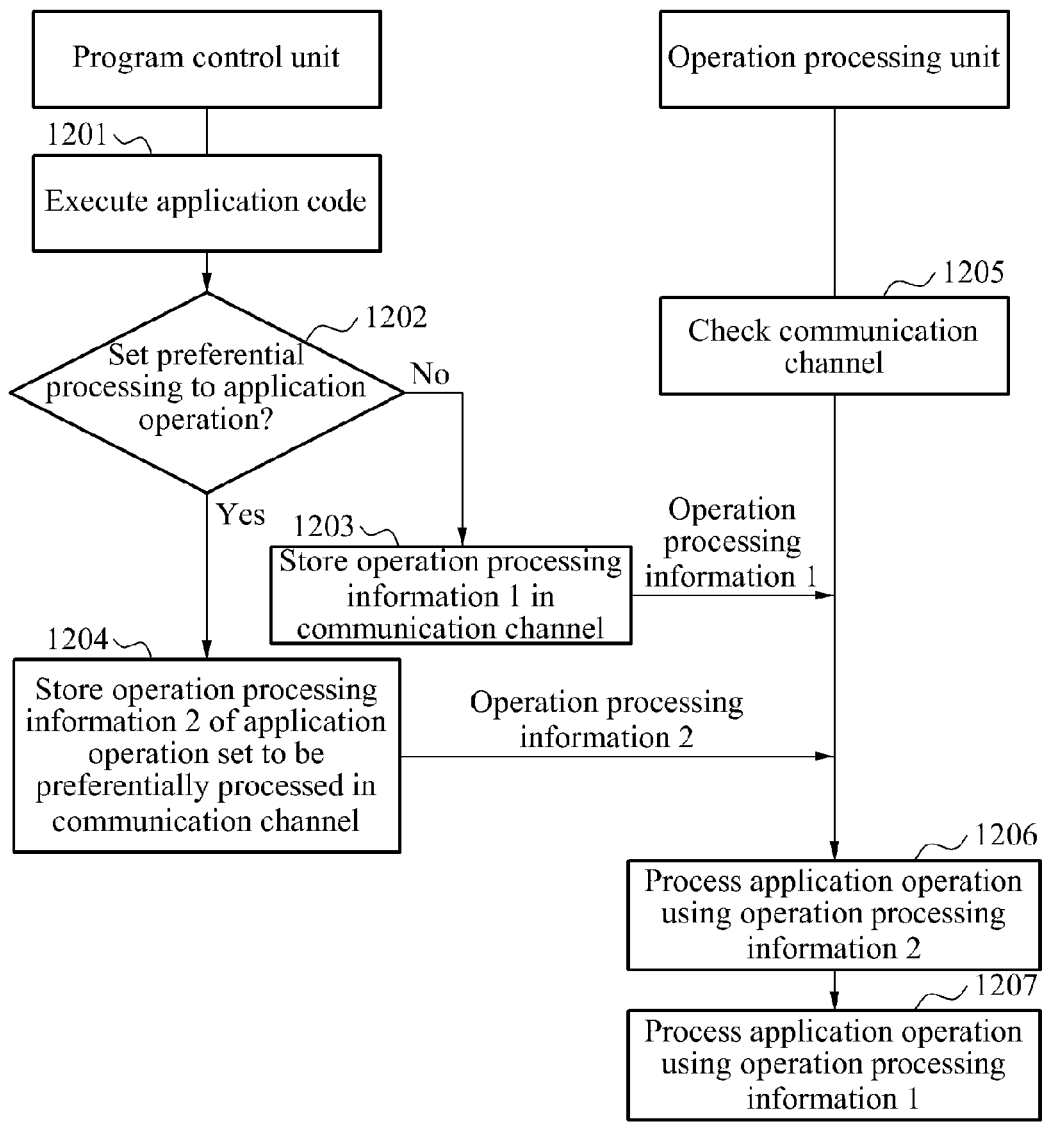
FIG. 12 illustrates a method of processing an application operation set to be preferentially processed, according to example embodiments.

FIG. 12 illustrates a method of processing an application operation set to be preferentially processed, according to example embodiments.

The method of FIG. 12 may be performed by the arithmetic processing apparatus of FIG. 2, as an example, although other apparatuses may equally be used to perform the method. The arithmetic processing apparatus may include a program control unit and an operation processing unit.

Referring to FIG. 12, the program control unit may execute an application code.

Here, when an application operation is not set to be preferentially processed in operation 1202: NO, the program control unit may temporarily store operation processing information 1 of the application operation not set to be preferentially processed, in a communication channel, in operation 1203. For example, the program control unit may temporarily store the operation processing information 1 in a forward FIFO buffer.

When the application operation is set to be preferentially processed in operation 1202: YES, the program control unit may temporarily store the operation processing information 2 of the application operation set to be preferentially processed, in the communication channel, in operation 1204.

For example, the program control unit may temporarily store the operation processing information 2 in a forward quick FIFO buffer. The forward quick FIFO buffer may be used to store an operation that needs to be preferentially processed to the operation processing information stored in the forward FIFO buffer.

The program control unit and the operation processing unit may promise in advance an application set to be preferentially processed among application operations necessary for execution of the application.

When the promise is not made, the program control unit may temporarily store a preferential operation flag in the communication channel along with the operation processing information.

For example, when the operation processing information of the application operation that needs to be preferentially processed and the operation processing information 1 of the application operation that does not need to be preferentially processed both use the forward FIFO buffer, the program control unit may store the preferential operation flag in the forward FIFO buffer along with the operation processing information 2. In this case, when the processing result of the application operation needs to be promptly checked, the program control unit may determine that the application operation needs to be preferentially processed.

In operation 1205, the operation processing unit may monitor the communication channel, thereby determining whether the operation processing information is stored in the communication channel.

For example, the operation processing unit may monitor the forward FIFO buffer and the forward quick FIFO buffer and thereby determine whether the operation processing information is stored. In detail, the operation processing unit may confirm whether all operation parameters necessary for the application operation are stored in the communication channel, that is, the forward FIFO buffer or the forward quick FIFO buffer.

In addition, when it is confirmed that the operation processing information 2 is stored, the operation processing unit may read the operation processing information 2 from the communication channel and thereby process the application operation set to be preferentially processed in operation 1206.

For example, when the operation processing unit confirms that the operation processing information 1 is stored in the forward FIFO buffer and the operation processing information 2 is stored in the forward quick FIFO buffer, the operation processing unit may process the application operation corresponding to the operation processing information 2 preferentially to the application operation corresponding to the operation processing information 1.

Here, when the program control unit has promised the operation processing unit in advance that the program control unit needs feedback information as a processing result of the application operation set to be preferentially processed, the operation processing unit may temporarily store the feedback information in the communication channel.

For example, the operation processing unit may store the feedback information in at least one of a backward FIFO buffer and a backward quick FIFO buffer. Therefore, the program control unit may read the feedback information from the communication channel and thereby store operation processing information necessary for processing of a next application operation, in the communication channel.

In operation 1207, the operation processing unit may read the operation processing information 1 from the communication channel and thereby process the application operation.

For example, when processing of the application operation set to be preferentially processed is completed, the operation processing unit may process the application operation not set to be preferentially processed.

Figure 13:
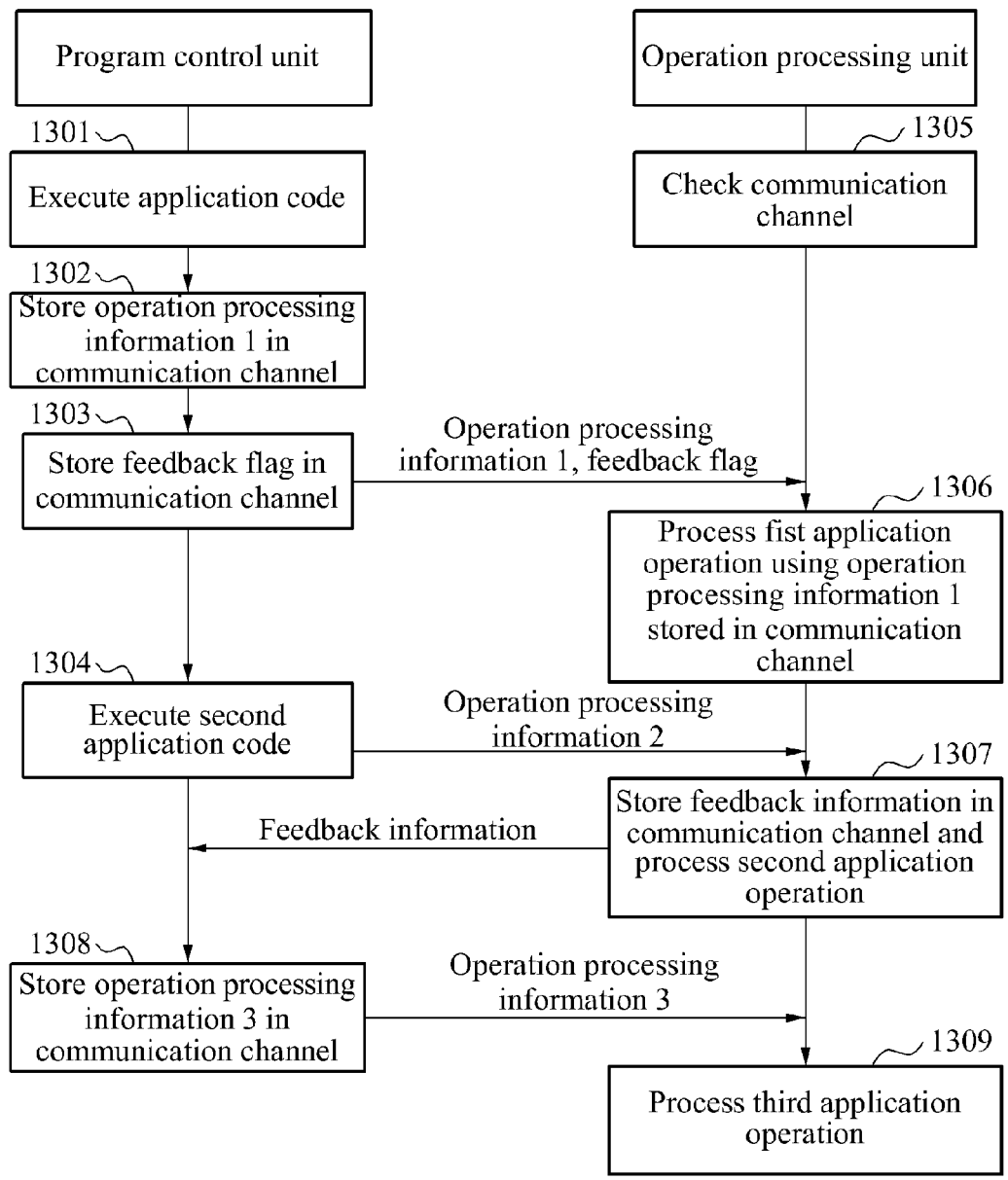
FIG. 13 illustrates a method of determining necessity of feedback of feedback information, according to example embodiments.

FIG. 13 illustrates a method of determining necessity of feedback of feedback information, according to example embodiments.

The method of FIG. 13 may be performed by the arithmetic processing apparatus of FIG. 2, as an example, although other apparatuses may equally be used to perform the method. The arithmetic processing apparatus may include a program control unit and an operation processing unit.

Referring to FIG. 13, in operation 1301, the program control unit may execute an application code.

In operation 1302, the program control unit may temporarily store operation processing information 1 necessary for a first application operation in a communication channel.

When the operation processing unit needs the feedback information which is a processing result of the first application operation, the program control unit may temporarily store a feedback flag in the communication channel along with the operation processing information in operation 1303. For example, the program control unit may store the operation processing information 1 and the feedback flag in at least one of a forward FIFO buffer and a forward quick FIFO buffer.

For example, when the feedback information of the first application operation is necessary for processing of a second application operation, the program control unit may temporarily store the feedback flag in the communication channel along with the operation processing information 1. Here, when the program control unit and the operation processing unit have promised an application operation that needs the feedback information during driving of an application in advance, the program control unit may not store the feedback flag in the communication channel.

Next, in operation 1304, after the operation processing information 1 and the feedback flag are stored in the communication channel, the program control unit may execute a second application code.

Additionally, the program control unit may temporarily store operation processing information 2 necessary for the second application operation in the communication channel. That is, the program control unit may execute the second application code and temporarily store the operation processing information 2 in the communication channel, without waiting until the operation processing unit completes processing of the first application operation.

In operation 1305, the operation processing unit may monitor the communication channel and thereby confirm whether the operation processing information is stored in the communication channel.

Here, the operation processing unit may confirm that the feedback flag is stored in the communication channel by monitoring the communication channel. Therefore, the operation processing unit may determine that the program control unit needs the feedback information of the application operation, based on the feedback flag.

Next, in operation 1306, the operation processing unit may read the operation processing information 1 from the communication channel and thereby process the first application operation.

In operation 1307, the operation processing unit may temporarily store the feedback information which is the processing result of the first application operation, in the communication channel. Next, the operation processing unit may process the second application operation using the operation processing information 2.

When the feedback information of the first application operation is stored in the communication channel, the program control unit may read the feedback information from the communication channel and thereby generate operation processing information 3 necessary for a third application operation in operation 1308. Additionally, the program control unit may temporarily store the operation processing information 3 in the communication channel.

For example, the program control unit may store the operation processing information 3 necessary for the third application operation using the feedback information of the first application operation. Therefore, in operation 1309, the operation processing unit may process the third application operation using the operation processing information 3.

Although the communication channel has been described as the FIFO buffer in the example embodiments of FIGS. 12 and 13, this is only by way of example. At least one of a shared memory, a register, and a hardwire may also be used as the communication channel.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the arithmetic processing apparatuses described herein.

Example embodiments have been described above. Nevertheless, it should be understood that various modifications may be made by those skilled in the art. For example, suitable results may be achieved if the described techniques are performed in a different order and/or if components in a described system, architecture, device, or circuit are combined in a different manner and/or replaced or supplemented by other components or their equivalents.

Expressions such as "at least one of," when preceding a list of elements, may be interpreted as modifying or referring to the entire list of elements following the expression.

Accordingly, other implementations are within the scope of the following claims.

What is claimed is:

1. An arithmetic processing apparatus comprising:
a program control unit to store operation processing information necessary for a second application operation in a communication channel by executing an application code; and
an operation processing unit to process the second application operation using the operation processing information stored in the communication channel, wherein the program control unit stores the operation processing information necessary for the second application operation before the operation processing unit completes processing of a first application operation, and the second application operation denotes operation to be processed after the first application operation.

2. The arithmetic processing apparatus of claim 1, wherein the operation processing unit stores feedback information corresponding to a processing result of the second application operation in the communication channel.

3. The arithmetic processing apparatus of claim 2, wherein the program control unit processes the second application operation based on the feedback information stored in the communication channel.

4. The arithmetic processing apparatus of claim 1, wherein the program control unit stores, in the communication channel, the operation processing information of the second application operation which is set to be preferentially processed.

5. The arithmetic processing apparatus of claim 1, wherein the operation processing unit stores, in the communication channel, feedback information of the second application operation which is set to be preferentially processed.

6. The arithmetic processing apparatus of claim 1, wherein the program control unit stores the operation processing information in the communication channel depending on a presence of overflow of the communication channel.

7. The arithmetic processing apparatus of claim 1, wherein
the program control unit processes a partial operation of an entire operation necessary for the first application operation and the second application operation, and
the operation processing unit processes a remaining operation excluding the partial operation, thereby completing processing of the first application operation and the second application operation.

8. The arithmetic processing apparatus of claim 1, wherein the operation processing information comprises at least one selected from data necessary for processing of the first application operation, an address of a memory storing the data, and an operation parameter.

9. The arithmetic processing apparatus of claim 1, further comprising:
a communication channel comprising a first line and a second line.

10. The arithmetic processing apparatus of claim 9, wherein the first line and the second line each comprise at least one selected from a buffer, a shared memory, a register, and a hardwire.

11. The arithmetic processing apparatus of claim 9, wherein the first line of the communication channel is configured to transmit information from the operation processing unit to the program control unit and the second line of the communication channel is configured to transmit information from the program control unit to the operation processing unit.

12. The arithmetic processing apparatus of claim 1, further comprising:
a communication channel comprising:
a first line configured to conduct information from the program control unit to the operation processing unit; and
a second line configured to conduct information from the operation processing unit to the program control unit;

wherein the program control unit transmits information relevant to the first application operation to the operation processing unit via the first line when processing of an application by the program control unit needs to be accelerated using the operation processing unit and
wherein the operation processing unit transmits feedback information corresponding to a processing result of the second application operation to the program control unit via the second line.

13. An arithmetic processing method comprising:
storing operation processing information necessary for a second application operation in a communication channel by executing an application code; and
processing the second application operation using the operation processing information stored in the communication channel,
wherein the storing of the operation processing information comprises storing operation processing information necessary for the second application operation before processing of a first application operation is completed using the operation processing information stored in the communication channel, and
wherein the second application operation denotes an operation to be processed after the first application operation.

14. The arithmetic processing method of claim 13, wherein the communication channel comprises a first line and a second line, with the first line of the communication channel being configured to transmit information from the operation processing unit to the program control unit and the second line of the communication channel being configured to transmit information from the program control unit to the operation processing unit.

15. The arithmetic processing method of claim 13, wherein
the storing of the operation processing information comprises processing a partial operation of an entire operation necessary for the first application operation and the second application operation, and
the processing of the application operation comprises processing a remaining operation excluding the partial operation, thereby completing processing of the first application operation and the second application operation.

16. A communication channel channeling data between a program control unit and an operation processing unit of an arithmetic processor, the communication channel comprising:
a forward first in first out ("FIFO") buffer configured to transmit information from the program control unit to the operation processing unit;
a forward Quick FIFO buffer configured to transmit information from the program control unit to the operation processing unit;
a backward FIFO buffer configured to transmit information from the operation processing unit to the program control unit; and
a backward Quick FIFO buffer configured to transmit information from the operation processing unit to the program control unit,
wherein the program control unit stores operation processing information necessary for a second application operation before the operation processing unit completes processing of a first application operation, and the second application operation denotes operation to be processed after the first application operation.

17. The communication channel of claim 16, wherein when processing of an application by the program control unit needs to be accelerated using the operation processing unit, the program control unit transmits relevant information to the operation processing unit via the forward FIFO buffer when the program control unit does not have to instantly check a processing result of the operation processing unit and via the forward Quick FIFO buffer when the program control unit does have to instantly check the processing result of the operation processing unit.

18. The communication channel of claim 16, wherein the operation processing unit transmits an executed operation of the application to the program control unit via the backward FIFO buffer when the program control unit does not have to instantly check a processing result of the operation processing unit and via the backward Quick FIFO buffer when the program control unit does have to instantly check the processing result of the operation processing unit.

* * * * *